(12) United States Patent
Bickham et al.

(10) Patent No.: US 8,385,702 B2
(45) Date of Patent: Feb. 26, 2013

(54) BEND RESISTANT MULTIMODE OPTICAL FIBER

(75) Inventors: Scott Robertson Bickham, Corning, NY (US); Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 374 days.

(21) Appl. No.: 12/770,250

(22) Filed: Apr. 29, 2010

(65) Prior Publication Data

US 2010/0303428 A1  Dec. 2, 2010

Related U.S. Application Data

(60) Provisional application No. 61/181,898, filed on May 28, 2009.

(51) Int. Cl.
*G02B 6/032* (2006.01)
(52) U.S. Cl. .................................................. 385/124
(58) Field of Classification Search .................. 385/124
See application file for complete search history.

(56) References Cited

FOREIGN PATENT DOCUMENTS
WO  2006010798 A1  2/2006

*Primary Examiner* — Jerry Rahll
(74) *Attorney, Agent, or Firm* — Robert L. Carlson

(57) ABSTRACT

Bend resistant multimode optical fibers are disclosed herein. Multimode optical fibers disclosed herein comprise a core region and a cladding region surrounding and directly adjacent to the core region, the cladding region comprising a depressed-index annular region, wherein the inner boundary of said depressed index region is an extension of the graded index core, the depressed region having a moat volume greater than 105%-$um^2$.

20 Claims, 1 Drawing Sheet

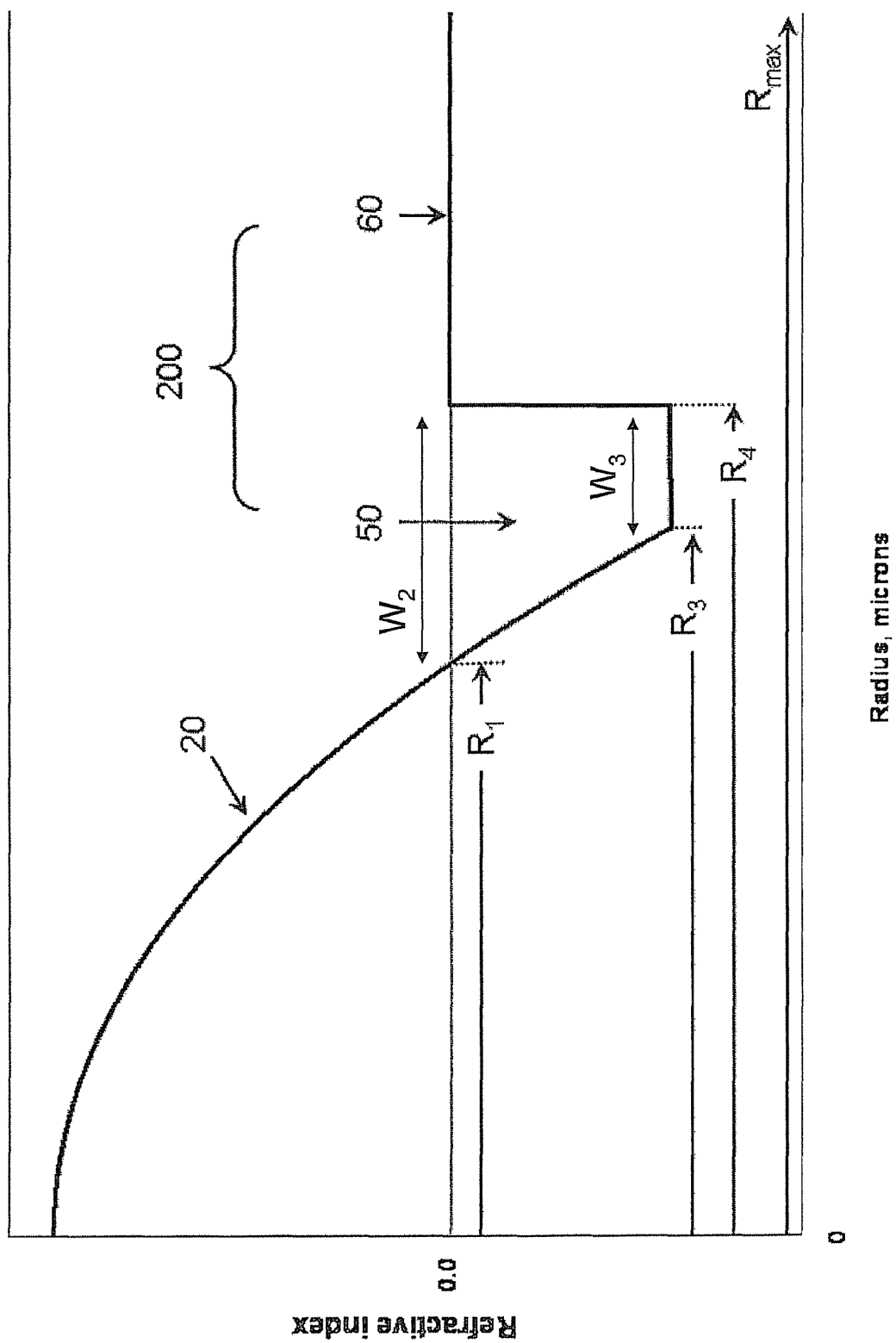

BEND RESISTANT MULTIMODE OPTICAL FIBER

CROSS-REFERENCE TO RELATED APPLICATIONS

This application claims the benefit of, and priority to U.S. Provisional Patent Application No. 61/181,898 filed on May 28, 2009 entitled, "Bend Resistant Multimode Optical Fiber", the content of which is relied upon and incorporated herein by reference in its entirety.

BACKGROUND

1. Field

The present invention relates generally to optical fibers, and more specifically to multimode optical fibers.

2. Technical Background

Corning Incorporated manufactures and sells InfiniCor® 62.5 µm optical fiber, which is multimode optical fiber having a core with a maximum relative refractive index delta of about 2% and 62.5 µm core diameter, as well as InfiniCor® 50 µm optical fiber, which is multimode optical fiber having a core with a maximum relative refractive index delta of about 1% and 50 µm core diameter. It would be desirable to develop alternative multimode fiber designs, particularly designs that would enable improved bend performance and higher bandwidth.

SUMMARY

High bandwidth, bend resistant multimode optical fibers are disclosed herein. Exemplary multimode optical fibers are disclosed herein which are multimoded at 850 nm, and preferably comprise a graded index multimode glass core having an optical core radius between 21 and 27 microns and a maximum refractive index delta at 850 nm, $\Delta 1MAX$. A depressed index annular region surrounds the multimode core and exhibits minimum refractive index delta at 850 nm, $\Delta 2MIN$, wherein the inner boundary of the depressed index region is an extension of the graded index core. The depressed region preferably has a moat volume greater than 120% µm². An outer cladding region preferably surrounds the depressed index region and exhibits a refractive index delta at 850 nm, $\Delta 3$, wherein $\Delta 1MAX > \Delta 3 > \Delta 2MIN$. The fibers disclosed herein preferably exhibit (a) an overfilled bandwidth of greater than 1.5 GHz-km at a wavelength of 850 nm, and (b) a 1 turn 10 mm diameter mandrel wrap attenuation increase at a wavelength of 1550 nm, in dB, of less than 0.28 dB.

The depressed-index annular region of the cladding is thus immediately adjacent the core. Preferably, the refractive index profile of the core has a parabolic or substantially parabolic shape. The depressed-index annular region may, for example, comprise glass comprising a plurality of voids, or glass doped with a downdopant such as fluorine, boron or mixtures thereof, or glass doped with one or more of such downdopants and additionally glass comprising a plurality of voids. The depressed-index annular region may be achieved, for example, by designing the depressed index annular region to be substantially undoped silica, and doping outer annular region 60 of the cladding glass with an updopant such as $GeO_2$, $Al_2O_3$, $P_2O_5$ or mixtures thereof. In some embodiments the volume of the depressed index annular region is preferably greater than 100%-µm², more preferably greater than 120%-µm² and even more preferably greater than 130%-µm², even more preferably greater than 140%-µm² and in some cases greater than 150%-µm² or 160%-µm². The volume of the depressed index annular region is preferably less than 220%-µm², more preferably less than 200%-µm² and even more preferably less than 180%-µm². In some embodiments the volume of the depressed index annular region is preferably greater than 200%-µm², more preferably greater than 220%-µm² and even more preferably greater than 240%-µm². The volume of the depressed index annular region is preferably less than 340%-µm². In some embodiments, the multimode optical fiber comprises a graded index glass core; and the depressed-index annular region exhibits a refractive index delta less than about –0.25% and a width of at least 0.5, more preferably greater than 1 micron.

The multimode optical fiber disclosed herein exhibits very low bend induced attenuation, in particular very low macrobending induced attenuation, yet at the same time is capable of high overfilled bandwidth. In some embodiments, high bandwidth is provided by low maximum relative refractive index in the core, and low bend losses are also provided. The fiber designs disclosed herein are capable of exhibiting a numerical aperture of greater than 0.185 and less than 0.215, and an overfilled bandwidth greater than 1.5 GHz-km at 850 nm, more preferably greater than 3.0 GHz-km at 850 nm, even more preferably greater than 4.5 GHz-km at 850 nm.

Using the designs disclosed herein, multimode fibers having an optical core radius between 21 and 27 microns can be made which provide (a) an overfilled bandwidth greater than 1.5 GHz-km at 850 nm, more preferably greater than 3 GHz-km at 850 nm, even more preferably greater than 4.5 GHz-km at 850 nm. These high bandwidths can be achieved while still maintaining a 1 turn 10 mm diameter mandrel wrap attenuation increase at a wavelength of 850 nm, of less than 0.28 dB, more preferably less than 0.25 dB, even more preferably less than 0.2 dB, and most preferably less than 0.15 dB. Such fibers are further capable of providing a numerical aperture (NA) greater than 0.185 and less than 0.215. Such fibers are further simultaneously capable of exhibiting an OFL bandwidth at 1300 nm which is greater than 500 MHz-km, more preferably greater than 600 MHz-km, even more preferably greater than 700 MHz-km. Such fibers are further simultaneously capable of exhibiting minimum calculated effective modal bandwidth (Min EMBc) bandwidth of greater than about 1.5 MHz-km, more preferably greater than about 2.0 MHz-km and most preferably greater than about 2.5 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm. In some embodiments it may be desirable to spin the multimode fiber, as doing so may in some circumstances further improve the bandwidth for optical fiber having a depressed cladding region. By spinning, we mean applying or imparting a spin to the fiber wherein the spin is imparted while the fiber is being drawn from an optical fiber preform, i.e. while the fiber is still at least somewhat heated and is capable of undergoing non-elastic rotational displacement and is capable of substantially retaining the rotational displacement after the fiber has fully cooled.

In some embodiments, the core extends radially outwardly from the centerline to a physical core radius $R_1$ which is between 22 and 26 microns, more preferably between 22 and 25 µm, preferably between 22 and 24 µm; and the core preferably having optical core radius $R_2$, wherein $22 \leq R_2 \leq 27$ microns, more preferably $23 \leq R_2 \leq 26.5$ microns, most preferably $24 \leq R_2 \leq 26$ microns.

In some embodiments, the core has a maximum relative refractive index delta, less than or equal to 1.2% and greater than 0.5%, more preferably less than or equal to 0.95% and greater than 0.5%, and in some embodiments less than or equal to 0.95% or less than or equal to 0.85% and greater than 0.70%. However, this is not required, and the core could alternatively exhibit a maximum relative refractive index delta greater than 0.85% and in some embodiments even greater than 0.95%.

In some embodiments, the optical fiber exhibits a 1 turn 10 mm diameter mandrel attenuation increase of no more than 0.28 dB, preferably no more than 0.25 dB, even more preferably no more than 0.2 dB, and still more preferably no more than 0.15 dB, at all wavelengths between 800 and 1400 nm.

In a first aspect, multimode optical fiber is disclosed herein comprising a graded-index glass core, disposed about a longitudinal centerline, and a glass cladding surrounding the core. The cladding comprises a depressed-index annular region, and an outer annular cladding region. The depressed-index annular region directly abuts the core.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 1 shows a schematic representation (not to scale) of the refractive index profile of a cross-section of the glass portion of an exemplary embodiment of multimode optical fiber disclosed herein wherein the depressed-index annular region is offset from the core and is surrounded by an outer annular region.

DETAILED DESCRIPTION

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_{REF}^2)/2n_i^2$, where $n_i$ is the maximum refractive index in region i, unless otherwise specified. The relative refractive index percent is measured at 850 nm unless otherwise specified. Unless otherwise specified herein, $n_{REF}$ is the average refractive index of the outer annular region 60 of the cladding, which can be calculated, for example, by taking "N" index measurements ($n_{C1}$, $n_{C2}$, ... $n_{CN}$) in the outer annular region of the cladding (which in some preferred embodiments may be undoped silica), and calculating the average refractive index by:

$$n_C = (1/N) \sum_{i=1}^{i=N} n_{Ci}.$$

As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

Macrobend performance was determined according to FOTP-62 (IEC-60793-1-47) by wrapping 1 turn around either a 6 mm, 10 mm, 20 mm, 30 mm or other diameter mandrel as stated (e.g. "1×10 mm diameter macrobend loss" or the "1×20 mm diameter macrobend loss") and measuring the increase in attenuation due to the bending using an encircled flux launch (EFL) condition. The encircled flux was obtained by launching an overfilled pulse into an input end of a 2 m length of InfiniCor® 50 μm optical fiber which was deployed with a 1×25 mm diameter mandrel near the midpoint. The output end of the InfiniCor® 50 μm optical fiber was spliced to the fiber under test, and the measured bend loss is the ratio of the attenuation under the prescribed bend condition to the attenuation without the bend. The overfilled bandwidth was measured according to FOTP-204 using an overfilled launch. The minimum calculated effective modal bandwidth (Min EMBc) bandwidths were obtained from measured differential mode delay spectra as specified by TIA/EIA-455-220.

Bandwidth was measured at 850 nm (unless another wavelength is specified) according to FOTP-204 with overfilled launch.

As used herein, numerical aperture of the fiber means numerical aperture as measured using the method set forth in TIA SP3-2839-URV2 FOTP-177 IEC-60793-1-43 titled "Measurement Methods and Test Procedures-Numerical Aperture".

The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$ % is zero with respect to an outer annular cladding region 60, and r is in the range $r_i \leq r \leq r_f$, where $\Delta$ is defined above, $r_i$ is the initial point of the α-profile, $r_f$ is the final point of the α-profile, and α is an exponent which is a real number. For a profile segment beginning at the centerline (r=0), the α-profile has the simpler form $$\Delta(r) = \Delta(0)(1 - [|r|/(r_1)]^\alpha),$$

where $\Delta(0)$ is the refractive index delta at the centerline.

The optical core diameter 2*R2 is measured using the technique set forth in IEC 60793-1-20, titled "Measurement Methods and Test Procedures—Fiber Geometry", in particular using the reference test method outlined in Annex C thereof titled "Method C: Near-field Light Distribution." To calculate the optical core radius R2 from the results using this method, a 10-80 fit was applied per section C.4.2.2 to obtain the optical core diameter, which is then divided by 2 to obtain the optical core radius.

The depressed-index annular region has a profile volume, $V_2$, defined herein as:

$$2\int_{R_4}^{R_1} \Delta(r) r\, dr$$

where $R_1$ is the innermost radius where $\Delta(r)=0$ and $R_4$ is the depressed-index annular region outer radius as defined where the delta again reaches −0.05% (with respect to an outer annular cladding region 60) after passing through a minimum. For the fibers disclosed herein, the absolute magnitude of $V_2$ is preferably greater than 100%-µm², more preferably greater than 120%-µm² and even more preferably greater than 140%-µm². The volume of the depressed index annular region is preferably less than 220%-µm², more preferably less than 200%-µm² and even more preferably less than 180%-µm².

In some embodiments, the core comprises silica doped with germanium, i.e. germania ($GeO_2$) doped silica. Dopants other than germanium such as $Al_2O_3$ or $P_2O_5$, singly or in combination, may be employed within the core, and particularly at or near the centerline, of the optical fiber disclosed herein to obtain the desired refractive index and density. In some embodiments, the refractive index profile of the optical fiber disclosed herein is non-negative from the centerline to the outer radius of the core. In some embodiments, the optical fiber contains no index-decreasing dopants in the core.

FIG. 1 shows a schematic representation of the refractive index profile of a cross-section of the glass portion of a preferred embodiment of a multimode optical fiber comprising a glass core 20 and a glass cladding 200, the cladding comprising a depressed-index annular region 50, and an outer annular cladding region 60. The core 20 has outer physical core radius $R_1$, optical core radius $R_2$, and maximum refractive index delta $\Delta 1_{MAX}$. Depressed-index annular region 50 has minimum refractive index delta percent $\Delta 2_{MIN}$, width $W_2$ of depressed-index annular region 50, which is the distance from inner radius $R_1$ to outer radius $R_4$, and width $W_3$ which is the width of that portion of the depressed-index annular region 50 which is entirely outside of the outermost radius of the extended alpha shape of the core 20 (i.e., from inner radius $R_3$ to outer radius $R_4$. The depressed index annular region 50 surrounds and contacts the core 20. The core 20 comprises an alpha shape which continues into the depressed index annular region 50 and forms the inner radial boundary thereof. The outer annular region 60, which in some preferred embodiments may be undoped silica, surrounds and preferably contacts the depressed index annular region 50. The depressed-index annular region 50 has a refractive index profile $\Delta 2(r)$ with a minimum relative refractive index $\Delta 2_{MIN}$. The outer annular region 60 has a refractive index profile $\Delta 3(r)$ with a relative refractive index $\Delta 3$. Preferably, $\Delta 1_{MAX} > \Delta 3 > \Delta 2_{MIN}$. In some embodiments, the outer annular region 60 has a substantially constant refractive index profile, as shown in FIG. 1 with a constant $\Delta 3(r)$. $R_3$ is the radius at which the refractive index profile transitions from a graded index or parabolic shape with alpha between 1.9 and 2.3 to a flatter depressed index annular region 50 with alpha less than 1.9. The volume of the depressed index annular region 50 is in some embodiments preferably greater than 100%-µm², more preferably greater than 120%-µm² and even more preferably greater than 140%-µm². The volume of the depressed index annular region is in some embodiments preferably greater than 110 and less than 220%-µm², more preferably greater than 110 and less than 200%-µm² and even more preferably greater than 110 and less than 180%-µm². In some embodiments when $\Delta 1_{MAX}$ is >0.70%, the volume of the depressed index annular region 50 is less than 340%-µm². In some embodiments when $\Delta 1_{MAX}$ is >0.75%, the volume of the depressed index annular region 50 is less than 270%-µm². In some embodiments when $\Delta 1_{MAX}$ is >0.85, the volume of the depressed index annular region 50 is less than 210%-µm². In some embodiments when $\Delta 1_{MAX}$ is >0.95, the volume of the depressed index annular region 50 is less than 140%-µm².

In the multimode optical fiber disclosed herein, the core is a graded-index core, and preferably, the refractive index profile of the core has a parabolic (or substantially parabolic) shape; for example, in some embodiments, the refractive index profile of the core has an α-shape with an α value preferably between 1.9 and 2.3, more preferably between 2.0 and 2.2, and most preferably between about 2.05 and 2.15, as measured at 850 nm; in some embodiments, the refractive index of the core may have a centerline dip, wherein the maximum refractive index of the core, and the maximum refractive index of the entire optical fiber, is located a small distance away from the centerline, but in other embodiments the refractive index of the core has no centerline dip, and the maximum refractive index of the core, and the maximum refractive index of the entire optical fiber, is located at the centerline. The parabolic shape of the core extends to outer radius $R_3$ and preferably extends from the centerline of the fiber to $R_3$. As used herein, "parabolic" therefore includes substantially parabolically shaped refractive index profiles which may vary slightly from an α value of about 2.0, for example 2.0, 2.05, 2.15 or 2.2, at one or more points in the core, as well as profiles with minor variations and/or a centerline dip.

One or more regions of the clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 is surrounded by at least one coating 210, which may in some embodiments comprise a low modulus primary coating and a high modulus secondary coating. Preferably, the optical fiber disclosed herein has a silica-based core and cladding. In some embodiments, the glass cladding 200 has an outer diameter, 2 times Rmax (maximum optical fiber radius), of between about 122 and 128 µm, more preferably about 125 µm. In some embodiments, one or more coatings surround and are in contact with the cladding.

In some embodiments, the depressed-index annular region comprises voids, either non-periodically disposed, or periodically disposed, or both. By "non-periodically disposed" or "non-periodic distribution", we mean that when one takes a cross section (such as a cross section perpendicular to the longitudinal axis) of the optical fiber, the non-periodically disposed voids are randomly or non-periodically distributed across a region of the fiber. Similar cross sections taken at different points along the length of the fiber will reveal different cross-sectional hole patterns, i.e., various cross sections will have different hole patterns, wherein the distributions of voids and sizes of voids do not match. That is, the voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than a few meters, and in many cases less than 1 meter along the length of the fiber. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein. As used herein, the diameter of a hole is the longest line segment whose endpoints are disposed on the silica internal surface defining the hole when the optical fiber is viewed in perpendicular cross-section transverse to the longitudinal axis of the fiber.

In some embodiments, the outer annular region 60 comprises substantially undoped silica, although the silica may contain some amount of chlorine, fluorine, germania, or other dopants in concentrations that collectively do not significantly modify the refractive index. In some embodiments, the depressed-index annular region 50 comprises silica doped with fluorine. In some embodiments, the depressed-index annular region 50 consists essentially of silica doped with fluorine. In some other embodiments, the depressed-index annular region 50 comprises silica comprising a plurality of non-periodically disposed voids. The voids can contain one or more gases, such as argon, nitrogen, krypton, $CO_2$, $SO_2$, oxygen, or mixtures thereof, or the voids can contain a vacuum with substantially no gas; regardless of the presence or absence of any gas, the refractive index in the annular region 50 is lowered due to the presence of the voids. The voids can be randomly or non-periodically disposed in the annular region 50 of the cladding 200, and in other embodiments, the voids are disposed periodically in the annular region 50. Alternatively, or in addition, the depressed index in annular region 50 can also be provided by downdoping the annular region 50 (such as with fluorine) or updoping one or more regions of the cladding and/or the core, wherein the depressed-index annular region 50 is, for example, silica which is not doped as heavily as the inner annular region 30. Preferably, the minimum relative refractive index, or average effective relative refractive index, such as taking into account the presence of any voids, of the depressed-index annular region 50 is preferably less than −0.25%, more preferably less than about −0.35%, even more preferably less than about −0.42%, even more preferably less than about −0.45%, and in some embodiments may be less than about −0.55%.

In one set of embodiments, the multimode optical fiber comprises a graded-index, preferably parabolic (substantially parabolic), glass core 20 and glass cladding 200 as depicted in FIG. 1, wherein $R_3$, marks the end of the graded index or parabolic shape. The core 20 is surrounded by and in direct contact with the depressed-index annular region 50, and the depressed-index annular region 50 is surrounded by and in direct contact with the outer annular region 60. In one preferred embodiment, Δ3(r) has a substantially constant refractive index profile. In another preferred embodiment, Δ3(r) has a maximum value Δ3max, a minimum value Δ3 min, wherein |Δ3max−Δ3 min|<0.2%. In another preferred embodiment |Δ3max−Δ3min|<0.1%. In still another preferred embodiment, |Δ3max−Δ3min|<0.05%. In some embodiments, the core 20 comprises germania doped silica, the outer annular region 60 comprises pure silica; in some of these embodiments, the depressed-index annular region 50 comprises hole-free fluorine-doped silica; in others of these embodiments, the depressed-index annular region 50 comprises a plurality of voids in pure silica; and in yet others of these embodiments, the depressed-index annular region 50 comprises a plurality of voids in fluorine-doped silica. In embodiments where the inner annular region 30 comprises pure silica and the depressed-index annular region 50 comprises pure silica with a plurality of voids, the depressed-index annular region 50 starts at the innermost radius of the innermost hole. In embodiments where the outer annular region 60 comprises pure silica, and the depressed-index annular region 50 comprises pure silica with a plurality of voids, the depressed-index annular region 50 ends at the outermost radius of the outermost hole.

Referring to FIG. 1 as one exemplary depiction of a refractive index profile of a multimode optical fiber disclosed herein, the cladding 200 comprises: a depressed-index annular region 50 surrounding the core 20 and directly adjacent thereto, and extending radially outwardly from inner radius $R_1$ to the outer boundary of depressed-index annular region radius, $R_4$, the region 50 having a relative refractive index profile, $\Delta_2(r)$ in %, with a minimum relative refractive index percent, $\Delta_{2MIN}$, in %, wherein $\Delta_{1MAX}>0>\Delta_{2MIN}$; and an outer annular region 60 surrounding the region 50 and directly adjacent thereto and having a relative refractive index percent, $\Delta_3$ (r) in %. The physical core radius $R_1$ is measured at the radius where the refractive index delta equals zero. Consequently, for an extended graded index core design where a portion of the cladding has a negative refractive index delta, the optical core radius $R_2$ is greater than the physical core radius $R_1$ but less than the inner radius $R_3$ of the depressed-index annular region 50, i.e. $R_1<R_2<R_3$. The depressed-index annular region 50 begins at $R_1$ and ends at $R_4$. The width $W_2$ of depressed-index annular region 50 is the distance from inner radius $R_1$ to outer radius $R_4$, and the width $W_3$ of the portion of depressed-index annular region 50 which is entirely outside of the extended alpha shape of the core 20 is the distance from inner radius $R_3$ to outer radius $R_4$. The width $W_3$ of the depressed-index annular region 50 is thus $R_4$−$R_3$. Cladding 200 extends to a radius, $R_{max}$, which is also the outermost periphery of the glass part of the optical fiber. In some embodiments, $R_{max}>40$ μm; in other embodiments, $R_{max}>50$ μm, and in other embodiments, $R_{max}>60$ μm, and in some embodiments, 60 μm$<R_{max}<70$ μm.

In some embodiments, $W_3$ is greater than 0.5 and less than 10 μm, more preferably greater than 1 μm and less than 8 μm, even more preferably greater than 2 μm and less than 6 μm.

Set forth below in Table 1 are a variety of modeled examples in accordance with the present invention, including peak refractive index delta % of the core, the alpha of the core, physical core radius $R_1$ of the core, optical core radius $R_2$ of the core 20, end radius $R_3$, which is the end of the alpha region which extends from the core into the depressed index region 50, $R_4$ which is the outer radius of depressed region 50, the minimum refractive index delta % of depressed index region 50, the width $W_3$ ($R_4$−$R_3$) of that portion of the depressed region 50 which is outside of the extended alpha shape region, and the absolute volume $V_2$ of the depressed region 50. Also set forth in the table for each example are numerical aperture, 1×10 mm diameter mandrel bend loss (attenuation increase per 1 turn) measured at 850 nm, 5×17.6 mm diameter mandrel bend loss (attenuation increase per 5 turns) measured at 850 nm, OFL bandwidth measured at 850 nm, and OFL bandwidth measured at 1300 nm Optical fibers in these examples have an outer glass diameter of 125 microns.

TABLE 1

| Parameter | Example 1 | Example 2 | Example 3 | Example 4 |
|---|---|---|---|---|
| Core delta % | 1 | 1 | 1 | 0.9 |
| Alpha | 2.096 | 2.096 | 2.096 | 2.096 |
| R1 (μm) | 25 | 25 | 25 | 23.4 |
| R2 Optical Core Radius (μm) | 27.7 | 25.05 | 25.8 | 25.85 |
| R3 (μm) | 30.5 | 30.5 | 30.5 | 29 |
| R4 (μm) | 35.5 | 30.5 | 32.5 | 34 |
| Moat delta % | −0.5 | −0.5 | −0.5 | −0.5 |
| W3 (μm) | 5 | 0 | 2 | 5 |
| Moat volume (%-sq. μm) | 242.3 | 77.2 | 140.3 | 230.9 |
| Numerical Aperture | 0.230 | 0.206 | 0.213 | 0.218 |
| 1 × 10 mm, 850 nm (dB) | 0.03 | 0.28 | 0.12 | 0.05 |
| 5 × 17.6 mm, 850 nm (dB) | 0.02 | 0.57 | 0.17 | 0.04 |
| 850 OFL BW (MHz-km) | 13257 | 13382 | 13259 | 16216 |
| 1300 OFL BW (MHz-km) | 672 | 677 | 672 | 736 |

| Parameter | Example 5 | Example 6 | Example 7 | Example 8 |
|---|---|---|---|---|
| Core delta % | 0.9 | 0.9 | 0.9 | 0.8 |
| Alpha | 2.096 | 2.096 | 2.096 | 2.096 |
| R1 (μm) | 23.4 | 23.4 | 23.4 | 22.4 |
| R2 Optical Core Radius (μm) | 24.8 | 23.7 | 24.9 | 25.3 |
| R3 (μm) | 29 | 29 | 27 | 28.3 |
| R4 (μm) | 32 | 30 | 34.6 | 33.3 |
| Moat delta % | −0.5 | −0.5 | −0.3 | −0.5 |
| W3 (μm) | 3 | 1 | 7.6 | 5 |
| Moat volume (%-sq. μm) | 164.9 | 102.9 | 166.9 | 198.5 |
| Numerical Aperture | 0.208 | 0.198 | 0.209 | 0.203 |
| 1 × 10 mm, 850 nm (dB) | 0.12 | 0.29 | 0.12 | 0.10 |
| 5 × 17.6 mm, 850 nm (dB) | 0.16 | 0.52 | 0.15 | 0.11 |
| 850 OFL BW (MHz-km) | 16216 | 16228 | 16573 | 19718 |
| 1300 OFL BW (MHz-km) | 736 | 738 | 748 | 843 |

| Parameter | Example 9 | Example 10 | Example 11 | Example 12 | Example 13 | Example 14 |
|---|---|---|---|---|---|---|
| Core delta % | 1 | 1 | 1 | 1 | 0.9 | 0.9 |
| Alpha | 2.096 | 2.096 | 2.096 | 2.096 | 2.096 | 2.096 |
| R1 (um) | 23.4 | 25 | 22.7 | 25 | 23.2 | 25 |
| R2 Optical Core Radius (um) | 23.65 | 25.2 | 23.55 | 25.9 | 23.55 | 25.35 |
| R3 (um) | 27.47 | 30.34 | 27.10 | 29.85 | 27.65 | 29.79 |
| Moat delta % | −0.4 | −0.5 | −0.45 | −0.45 | −0.4 | −0.4 |
| R4 (um) | 30.43 | 31.5 | 30.6 | 32.7 | 30.44 | 32.12 |
| W3 (um) | 2.96 | 1.16 | 3.50 | 2.85 | 2.79 | 2.33 |
| Moat volume (%-sq. um) | 110 | 110 | 140 | 140 | 110 | 110 |
| Numerical Aperture | 0.209 | 0.209 | 0.214 | 0.214 | 0.198 | 0.198 |
| 1 × 10 mm, 850 nm (dB) | 0.18 | 0.18 | 0.12 | 0.12 | 0.26 | 0.26 |
| 5 × 17.6 mm, 850 nm (dB) | 0.30 | 0.30 | 0.17 | 0.17 | 0.45 | 0.45 |
| 850 OFL BW (MHz-km) | 11484 | 11569 | 12023 | 11557 | 15511 | 14765 |
| 1300 OFL BW (MHz-km) | 624 | 609 | 600 | 607 | 704 | 713 |

| Parameter | Example 15 | Example 16 | Example 17 | Example 18 | Example 19 | Example 20 |
|---|---|---|---|---|---|---|
| Core delta % | 0.9 | 0.9 | 0.8 | 0.8 | 0.8 | 0.8 |
| Alpha | 2.096 | 2.096 | 2.096 | 2.096 | 2.096 | 2.096 |
| R1 (um) | 21.2 | 23.8 | 23.2 | 25 | 19.4 | 21.7 |
| R2 Optical Core Radius (um) | 23.55 | 26.45 | 26.45 | 26.45 | 23.6 | 26.4 |
| R3 (um) | 27.05 | 29.38 | 28.15 | 30.58 | 24.90 | 28.82 |
| Moat delta % | −0.6 | −0.5 | −0.4 | −0.42 | −0.55 | −0.65 |
| R4 (um) | 30.67 | 33.69 | 31.47 | 33.0 | 31.45 | 32.66 |
| W3 (um) | 3.62 | 4.31 | 3.32 | 2.42 | 6.55 | 3.84 |
| Moat volume (%-sq. um) | 210 | 210 | 130 | 130 | 270 | 270 |
| Numerical Aperture | 0.214 | 0.214 | 0.187 | 0.187 | 0.214 | 0.214 |
| 1 × 10 mm, 850 nm (dB) | 0.07 | 0.07 | 0.27 | 0.27 | 0.04 | 0.04 |
| 5 × 17.6 mm, 850 nm (dB) | 0.07 | 0.07 | 0.41 | 0.41 | 0.03 | 0.03 |
| 850 OFL BW (MHz-km) | 15185 | 14907 | 18770 | 18508 | 19041 | 19619 |
| 1300 OFL BW (MHz-km) | 657 | 669 | 780 | 765 | 806 | 804 |

| Parameter | Example 21 | Example 22 | Example 23 | Example 24 |
|---|---|---|---|---|
| Core delta % | 0.7 | 0.7 | 0.7 | 0.7 |
| Alpha | 2.096 | 2.096 | 2.096 | 2.096 |
| R1 (um) | 21.8 | 24.5 | 16.5 | 18.5 |
| R2 Optical Core Radius (um) | 23.55 | 26.4 | 23.65 | 26.45 |
| R3 (um) | 28.19 | 31.68 | 22.97 | 25.75 |
| Moat delta % | −0.5 | −0.5 | −0.7 | −0.7 |
| R4 (um) | 30.92 | 33.5 | 29.76 | 31.44 |
| W3 (um) | 2.73 | 1.82 | 6.79 | 5.69 |
| Moat volume (%-sq. um) | 160 | 160 | 340 | 340 |
| Numerical Aperture | 0.185 | 0.185 | 0.214 | 0.214 |

TABLE 1-continued

|  |  |  |  |  |
|---|---|---|---|---|
| 1 × 10 mm, 850 nm (dB) | 0.26 | 0.26 | 0.02 | 0.02 |
| 5 × 17.6 mm, 850 nm (dB) | 0.34 | 0.34 | 0.01 | 0.01 |
| 850 OFL BW (MHz-km) | 22994 | 22806 | 24747 | 23983 |
| 1300 OFL BW (MHz-km) | 869 | 885 | 989 | 950 |

It is to be understood that the foregoing description is exemplary of the invention only and is intended to provide an overview for the understanding of the nature and character of the invention as defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber which is multimoded at 850 nm, comprising a graded index multimode glass core having an optical core radius between 21 and 27 microns and a maximum refractive index delta at 850 nm, $\Delta 1MAX$, a depressed index annular region surrounding said multimode core exhibiting minimum refractive index delta at 850 nm, $\Delta 2MIN$, wherein the inner boundary of said depressed index region is an extension of the graded index core, the depressed region having a moat volume greater than 105%-um$^2$ and less than 220%-um$^2$ and an outer cladding region surrounding said depressed index region and exhibiting a refractive index delta at 850 nm, $\Delta 3$, wherein $\Delta 1MAX > \Delta 3 > \Delta 2MIN$, and wherein the fiber exhibits (a) an overfilled bandwidth of greater than 1.5 GHz-km at a wavelength of 850 nm, and (b) a 1 turn 10 mm diameter mandrel wrap attenuation increase at a wavelength of 1550 nm of less than 0.28 dB.

2. The multimode optical fiber of claim 1, wherein the moat volume is greater than 110%-um$^2$.

3. The multimode optical fiber of claim 2, wherein $\Delta 1MAX < 0.85\%$.

4. The multimode optical fiber of claim 2, wherein $\Delta 1MAX \leqq 0.95\%$.

5. The multimode optical fiber of claim 4, wherein the moat volume is less than 140%-um$^2$.

6. The multimode optical fiber of claim 2, wherein said fiber exhibits a numerical aperture of greater than 0.185 and less than 0.215.

7. The multimode optical fiber of claim 6, wherein said fiber exhibits an overfilled bandwidth of greater than 4.5 GHz-km at a wavelength of 850 nm.

8. The multimode optical fiber of claim 1, wherein the moat volume is greater than 130%-um$^2$.

9. The multimode optical fiber of claim 1, wherein 1 turn 10 mm diameter mandrel wrap attenuation increase at a wavelength of 850 nm, of less than 0.15 dB.

10. The multimode optical fiber of claim 1, wherein said depressed index annular region having a refractive index delta less than about −0.25% and a width of at least 1 micron.

11. The multimode optical fiber of claim 1, wherein $\Delta 1MAX < 0.85\%$.

12. The multimode optical fiber of 1, wherein said core exhibits a physical core radius R1 less than 25 microns.

13. The multimode optical fiber of 1, wherein said core exhibits a physical core radius R1 less than 24 microns.

14. The multimode optical fiber of claim 1, wherein $\Delta 1MAX \leqq 0.95\%$.

15. The multimode optical fiber of claim 14, wherein said fiber exhibits a numerical aperture of greater than 0.185 and less than 0.215.

16. The multimode optical fiber of claim 15, wherein the moat volume is greater than 130%-um$^2$.

17. The multimode optical fiber of claim 16, wherein 1 turn 10 mm diameter mandrel wrap attenuation increase at a wavelength of 850 nm of less than 0.15 dB.

18. The multimode optical fiber of 17, wherein said core exhibits a physical core radius R1 less than 24 microns.

19. The multimode optical fiber of claim 16, wherein said fiber exhibits an overfilled bandwidth of greater than 4.5 GHz-km at a wavelength of 850 nm.

20. The multimode optical fiber of claim 14, wherein said fiber exhibits an overfilled bandwidth of greater than 4.5 GHz-km at a wavelength of 850 nm.

* * * * *